(12) United States Patent
Golovin et al.

(10) Patent No.: US 7,979,494 B1
(45) Date of Patent: Jul. 12, 2011

(54) SYSTEMS AND METHODS FOR MONITORING MESSAGING SYSTEMS

(75) Inventors: Roman Alexandrovich Golovin, St. Petersburg (RU); Dmitry Arkadievich Sotnikov, St. Petersburg (RU); Konstantin Alexanderovich Galla, St. Petersburg (RU); Evgeney Sergeevich Bushmakin, St. Petersburg (RU); Artyom Vitalievich Agafonov, St. Petersburg (RU); Lance Masten, Huntley, IL (US)

(73) Assignee: Quest Software, Inc., Aliso Viejo, CA (US)

( * ) Notice: Subject to any disclaimer, the term of this patent is extended or adjusted under 35 U.S.C. 154(b) by 710 days.

(21) Appl. No.: 11/934,610

(22) Filed: Nov. 2, 2007

Related U.S. Application Data

(60) Provisional application No. 60/856,695, filed on Nov. 3, 2006.

(51) Int. Cl.
*G06F 15/16* (2006.01)
(52) U.S. Cl. .......................... 709/206; 709/224; 709/225
(58) Field of Classification Search .................. 709/206, 709/224, 225
See application file for complete search history.

(56) References Cited

U.S. PATENT DOCUMENTS

| | | | |
|---|---|---|---|
| 5,533,192 A | 7/1996 | Hawley et al. |
| 5,850,562 A | 12/1998 | Crump et al. |
| 6,189,142 B1 | 2/2001 | Johnston et al. |
| 6,412,106 B1 | 6/2002 | Leask et al. |
| 6,681,343 B1 | 1/2004 | Nakabo |
| 6,760,903 B1 | 7/2004 | Morshed et al. |
| 6,775,827 B1 | 8/2004 | Harkins |
| 7,065,566 B2 | 6/2006 | Menard et al. |
| 7,237,229 B2 | 6/2007 | Ogawa et al. |
| 7,302,675 B2 | 11/2007 | Rogers et al. |
| 7,506,313 B2 | 3/2009 | Bates et al. |
| 7,519,960 B2 | 4/2009 | Mei et al. |
| 7,607,124 B2 | 10/2009 | Gooty et al. |
| 7,886,287 B1 | 2/2011 | Davda |
| 2002/0049759 A1 | 4/2002 | Christensen |
| 2002/0173997 A1 | 11/2002 | Menard et al. |
| 2003/0004671 A1 | 1/2003 | Minematsu |
| 2003/0046663 A1 | 3/2003 | Rogers et al. |
| 2003/0093771 A1 | 5/2003 | Ogawa et al. |
| 2003/0167459 A1 | 9/2003 | Bates et al. |

(Continued)

OTHER PUBLICATIONS

"Exchange Server 2003 Design and Architecture at Microsoft." Microsoft, Technical White Paper. Aug. 2003. pp. 1-46.*

(Continued)

*Primary Examiner* — Larry Donaghue
*Assistant Examiner* — Nicholas Taylor
(74) *Attorney, Agent, or Firm* — Knobbe Martens Olson & Bear LLP

(57) ABSTRACT

Systems and methods for monitoring and/or auditing of events in an electronic messaging environment, such as Microsoft® Exchange, are described. One or more monitoring components are installed on messaging system servers to collect, in real-time, information on messaging system events. Certain embodiments are configured to audit and/or provide alerts regarding non-owner activity, such as when a user or administrator has gained access to another user's mailbox. Alerts can advantageously facilitate prompt corrective action by delivering detailed information about the access activity, such as which email message or folder was accessed, when the access occurred, from what location (e.g., IP address) when the access was initiated, and the type of access, as well as permission changes made to the mailbox or folders. The monitoring systems can also be configured to audit changes to client permissions for folders and delegate assignment and/or changes to configuration objects of the messaging system.

19 Claims, 6 Drawing Sheets

U.S. PATENT DOCUMENTS

| | | | |
|---|---|---|---|
| 2003/0208745 | A1 | 11/2003 | Bystricky et al. |
| 2004/0059789 | A1* | 3/2004 | Shum .......................... 709/206 |
| 2004/0210872 | A1 | 10/2004 | Dorr et al. |
| 2005/0027806 | A1* | 2/2005 | Schunemann ............... 709/206 |
| 2005/0071243 | A1 | 3/2005 | Somasekaran et al. |
| 2005/0177820 | A1 | 8/2005 | Mei et al. |
| 2005/0203881 | A1 | 9/2005 | Sakamoto et al. |
| 2006/0048227 | A1 | 3/2006 | Ohta et al. |
| 2007/0089099 | A1 | 4/2007 | Matsuo et al. |
| 2007/0168978 | A1 | 7/2007 | Lu |

OTHER PUBLICATIONS

"XADM: How to View Windows NT Accounts that Access Mailboxes in Exchange Server." Microsoft, Knowledge Base Article. Oct. 2006. pp. 1-3.*

"Debugger", http://en.wikipedia.org/wiki/Debugger Apr. 7, 2011. 5 Pages.

Bowles, Adrian J., Ph.D. "IT Compliance Strategies for Improved ROI," Robert Frances Group, Westport, CT. Aug. 2004.

ChangeAuditor; Real-time auditing for Active Directory, Exchange and File Servers, pp. 2 pages.

Cowan, Crispin. "Software Security for Open-Source Systems," WireX Communications, IEEE Computer Society, Jan. / Feb. 2003.

Hilfinger, P.N. "Simple Use of GBD," University of California Department of Electrical Engineering and Computer Sciences, Computer Science Division. Spring 1998. Retrieved from http://www.cs.berkeley.edu/~js/61bs00/reader/gdb.pdf on (Aug. 5, 2008).

http://www.auditsoftware.net/ Apr. 7, 2011. 2 pages.

http://www.whatsupgold.com/products/event-log-management/suite/index.aspx. Apr. 7, 2011. 3 Pages. Formally http://www.doriansoft.com/totalsolution/index.htm.

Intrust Plug-In for Exchange 1.1—Quick Start Guide, Copyright 2007, pp. 25 pages.

Intrust Plug-In for Exchange 1.1—User Guide, Copyright 2007, pp. 81 pages.

Intrust Plug-In for Exchange 1.1—What's New, Copyright 2007, pp. 10 pages.

Microsoft Corporation. "Audit Collection with Microsoft System Center Operations Manager 2007," Microsoft SystemCenter, Dec. 18, 2006.

Microsoft; How to Monitor Mailbox Access; http://support.microsoft.com/kb/867450, Feb. 28, 2007, Pages 2 pages.

Sandeep S. "Process Tracing Using Ptrace," Linux Gazette, Issue 81. Aug. 2002.

* cited by examiner

FIG. 6

Activity in non-own mailbox by Domain and User

| Domain | ANYDOMAIN | | | | |
|---|---|---|---|---|---|
| User | ABC | | | | |

| Date/Time | Server | Mailbox | Action | Object | Subject/Name |
|---|---|---|---|---|---|
| 12-20-2006 14:42:21 | W3EXCH | EFG | Read | Message | Test1 |
| 12-20-2006 14:42:22 | W3EXCH | EFG | Copy | Message | Test1 |
| 12-20-2006 14:42:25 | W3EXCH | EFG | Delete | Message | Test1 |
| 12-20-2006 14:42:26 | W3EXCH | EFG | Delete | Message | Test2 |
| 12-20-2006 14:42:33 | W3EXCH | QRS | Create | Folder | Test3 |
| 12-20-2006 14:42:33 | W3EXCH | QRS | Change | Folder | Test3 |

_680_

| User | EFG | | | | |
|---|---|---|---|---|---|

| Date/Time | Server | Mailbox | Action | Object | Subject/Name |
|---|---|---|---|---|---|
| 12-20-2006 14:00:38 | W3EXCH | ABC | Read | Message | Test4 |
| 12-20-2006 14:00:39 | W3EXCH | ABC | Delete | Message | Test5 |
| 12-20-2006 14:00:41 | W3EXCH | ABC | Delete | Message | Test6 |
| 12-20-2006 14:00:41 | W3EXCH | QRS | Read | Folder | Test7 |
| 12-20-2006 14:00:43 | W3EXCH | QRS | Delete | Message | Test8 |
| 12-20-2006 14:00:43 | W3EXCH | QRS | Change | Message | Test9 |

_682_

_600_

SYSTEMS AND METHODS FOR MONITORING MESSAGING SYSTEMS

RELATED APPLICATION

This application claims the benefit of priority under 35 U.S.C. §119(e) of U.S. Provisional Patent Application No. 60/856,695 filed on Nov. 3, 2006, and entitled "Apparatus and Method for Monitoring Messaging Systems," the entirety of which is hereby incorporated herein by reference.

BACKGROUND OF THE INVENTION

1. Field of the Invention

Embodiments of the invention generally relate to monitoring messaging systems and, in particular, to systems and methods for security, auditing and/or reporting of messaging system events.

2. Description of the Related Art

Electronic messaging, such as email and text messaging, is becoming increasingly popular in both the personal and business communities. For instance, email has become the predominant business tool for communication within and between organizations. With this predominance comes the usage of email as a repository of information, including sensitive or personal information. Such sensitive information has the potential for being misused and/or viewed and presents threats to corporate data security and compliance. For example, recent studies indicate that seventy-five percent of all corporate intellectual property is transmitted via email.

Unfortunately, many violations to corporate policies with respect to email go undetected since most security actions in such environments are not generally audited. For instance, Microsoft Exchange Server® is a commonly-used enterprise-class messaging platform that provides for collaboration and interaction by routing email between senders and recipients and storing the messages for later retrieval. Detailed security-based auditing, however, is not available through native Exchange mechanisms, leaving large security holes in the Exchange environment.

To address these and similar problems, certain software solutions provide for monitoring a directory service at an administrator level. Such solutions often include reporting changes to mailbox permissions at the domain or administrator level. A major drawback of these solutions is that such high-level monitoring and reporting does not present a user with a comprehensive picture of what is occurring in the messaging environment and does not provide detailed information necessary for prompt and particularized corrective action. For instance, such solutions do not monitor access performed by administrators or others with super or privileged access rights.

SUMMARY OF THE INVENTION

In view of the foregoing, a need exists for systems and methods that more fully address the security and compliance concerns surrounding messaging environments. More particularly, a need exists for systems and methods that securely collect, store, report and/or provide alerts on heterogeneous event data to meet the needs of external regulations, internal policies and/or security best practices.

For instance, there is a need for systems and methods for auditing messaging system activity, such as detecting non-owner mailbox access and/or activity within mailboxes by users and/or those with administrative privileges or super access rights. Moreover, a need exists for auditing permission changes, such as changes made through client permissions and delegates in Microsoft Outlook®, to improve security and facilitate compliance with regulations.

Certain embodiments of the invention address one or more of the foregoing needs. For example, in certain embodiments, systems and methods are disclosed for monitoring and/or auditing of events in an electronic messaging environment, such as Microsoft® Exchange. In certain embodiments, one or more monitoring components are installed on messaging system servers to collect, in real-time, information on messaging system events. These systems and methods can then audit and/or provide alerts regarding, for example, non-owner activity, such as when a user accesses another user's mailbox. These alerts can advantageously facilitate prompt corrective action by delivering detailed information about the access activity, such as which email message or folder was accessed, when the access occurred, from what location (e.g., Internet protocol (IP) address), and the type of access that was initiated, as well as permission changes made to the mailbox or folders. The monitoring systems can also be configured to audit changes to client permissions for folders and delegate assignment and/or changes to configuration objects of the messaging system.

In certain embodiments, a method is disclosed for auditing messaging activity in an electronic messaging system, such as for example, a Microsoft® Exchange system. The method comprises automatically examining, in real-time, a plurality of messaging events generated during operation of an electronic messaging service and detecting from the plurality of messaging events a request by a user to access a mailbox associated with the electronic messaging service. The method also includes determining an identity of the user and comparing the identity of the user with an identity of the mailbox owner. The method further includes determining the type of access performed by the user with respect to the mailbox and issuing an alert when the identity of the user is not the same as the identity of the mailbox owner, the alert reporting information on the mailbox accessed, the identity of the user and the type of access performed by the user with respect to the mailbox.

In certain embodiments, a system is disclosed for auditing user activity in an electronic messaging environment. The system comprises a monitoring component configured to execute on a server running an electronic messaging service. The monitoring component further comprises: (1) an interceptor module configured to detect, in real-time, a call generated by a user to access a mailbox of the electronic messaging service, (2) a comparison module in communication with the interceptor module, the comparison module being configured to transmit a non-owner access event when the user is not the owner of the mailbox being accessed, and (3) an activity monitor configured to determine a type of access associated with the call to access the mailbox. The system also includes a user interface component in network communication with the monitoring component, the user interface component being configured to automatically generate an alert in response to the comparison module transmitting the non-owner access event, the alert comprising information indentifying the accessed mailbox, an identity of the user and the type of access performed by the user with respect to the mailbox.

In certain embodiments, a system is disclosed for auditing activity in an electronic messaging service. The system comprises means for automatically examining, in real-time, messaging events generated during operation of an electronic messaging service; means for detecting from the messaging events a request by a user to access a mailbox associated with the electronic messaging service; means for determining an identity of the user; means for comparing the identity of the user with an identity of the mailbox owner; means for determining the type of access performed by the user with respect to the mailbox; and means for issuing an alert when the identity of the user is not the same as the identity of the mailbox owner, the alert reporting information on the mailbox accessed, the identity of the user and the type of access performed by the user with respect to the mailbox.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 6 illustrates an exemplary embodiment of a screen display of a non-owner mailbox access report usable by the monitoring system of FIG. 1.

DETAILED DESCRIPTION OF THE PREFERRED EMBODIMENTS

Figure 1:
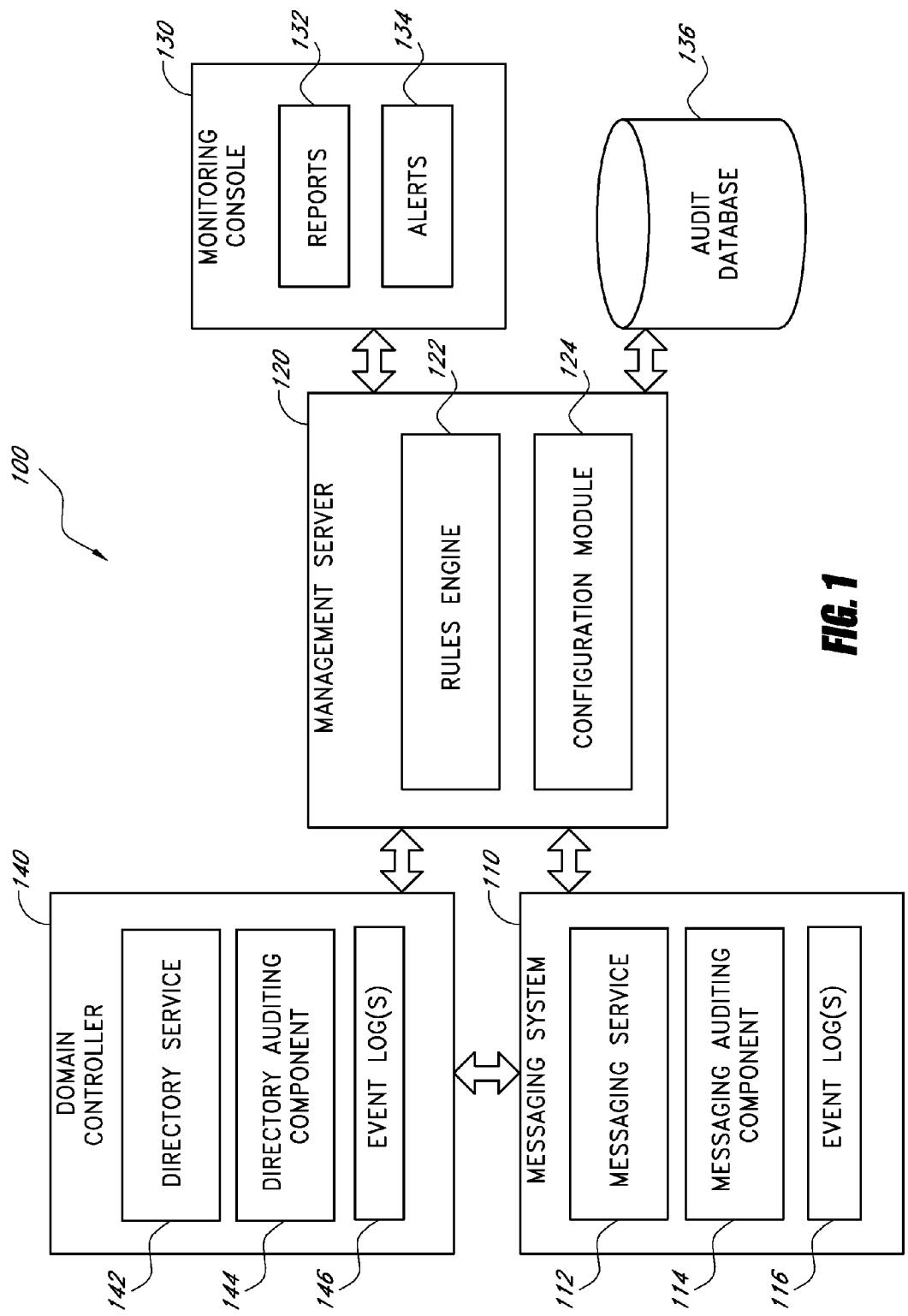
FIG. 1 illustrates a block diagram of a system for monitoring a messaging environment according to certain embodiments of the invention.

Embodiments of the invention disclosed herein are designed to provide for real-time security auditing and reporting of activity in an electronic messaging environment. For instance, certain embodiments enable tracking of user activity, non-owner mailbox access and/or changes to client permissions for folders and delegate assignment. Embodiments of the invention can also provide for auditing of changes to configuration objects and permissions for a messaging system, such as for example Microsoft Exchange Server®, and mailboxes. For instance, certain embodiments of the invention comprise systems and methods for collecting and storing audit data that enables a user to monitor policy violations in both clustered and non-clustered messaging system configurations.

In certain embodiments, the monitoring systems and methods disclosed herein are configured to advantageously respond in real time to select events and changes in a Microsoft® Exchange messaging system. Administrators can be notified by email or other alerts when possible violations and changes occur. In addition, the disclosed monitoring tools can take automatic action in response to suspicious or potentially harmful events, such as by quickly disabling a violator's account or reversing the undesired changes.

Certain embodiments of the invention are configured to audit non-owner activity. For instance, embodiments of the invention advantageously alert administrators when one or more users have gained access to another user's mailbox. Embodiments of the invention also can deliver detailed information about the access activity, such as which email message or folder was accessed, when the access occurred, from what location the access was initiated, as well as permission changes made to the mailbox or folders.

Moreover, certain embodiments of the invention are configured to monitor non-owner activity by administrators and/or others with super access rights. Such embodiments advantageously address a major security issue in that administrators and like personnel often have the ability and know-how to erase or modify information related to logons and other general access information.

In certain embodiments, monitoring systems and methods are further configured to audit configuration and permission changes. For instance, certain embodiments of the invention collect detailed information related to changes to client permissions in mailboxes on an Exchange server. Such information can include: who made the change, where the change occurred and the before-and-after values. This information can allow an administrator to troubleshoot Exchange problems and reverse changes, if necessary. It also allows organizations to trace changes to Exchange security and policy settings to determine compliance breaches.

Furthermore, certain embodiments of the invention are adapted to audit user activity, such as by collecting and correlating unusual user and suspicious administrator activity. For example, a monitoring system may report on permission changes made to a mailbox within Active Directory® or at the local Outlook® client as well as identify anyone using "send-as" privileges.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the inventions.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

FIG. 1 illustrates a block diagram of a system 100 for monitoring a messaging environment, according to certain embodiments of the invention. In general, the illustrated monitoring system 100 is configured to provide for real-time security auditing and/or reporting on activity in the messaging environment. For example, the messaging environment can comprise a Microsoft® Exchange environment. In yet other embodiments, the messaging environment can comprise a Lotus Notes® system or other like electronic messaging system.

As shown in FIG. 1, the monitoring system 100 comprises a messaging system 110 in communication with a management server 120, which is in further communication with a monitoring console 130. In general, the management server 120 coordinates real-time monitoring and/or reporting of activity on the messaging system 110. As discussed in more detail below, the monitoring console 130 provides for user interaction with the management server 120.

In certain embodiments, the messaging system 110 comprises an electronic messaging system, such as an email system. Moreover, the messaging system 110 can comprise a single computer or server or can be distributed among multiple servers coupled through a network.

The illustrated messaging system 110 further includes a messaging service 112 and a messaging auditing component 114. The messaging service 112 can include, for example, features such as email, calendars, appointments, address book(s), contacts, folders, distribution lists, posts, messages, tasks or to-do lists, notes, journal entries, combinations of the same or the like. For instance, in certain preferred embodiments, the messaging service 112 comprises Microsoft Exchange Server®. In such embodiments, an Exchange store on one or more servers can provide for a single repository for the Exchange server data.

The messaging auditing component or module 114 also resides on the messaging system 110. In certain embodiments, the messaging auditing component 114 can include software modules or subcomponents for real-time monitoring or auditing the messaging service 112. For example, the messaging auditing component 114 can be configured to monitor user activity, non-owner mailbox access and configuration changes in the messaging service 112. Moreover, in certain embodiments, the messaging auditing component 114 can monitor data passed to and/or from the messaging system 110, such as Exchange data written to or read from the Exchange store. In certain embodiments, the data obtained by the messaging auditing component 114 can be used as audit data and/or to identify potential security breaches or threats in the messaging system 110.

It will be appreciated that, in other embodiments, the messaging auditing component 114 can at least partially reside on a remote system such as the management server 120. For instance, the messaging auditing component 114 can be in the form of various modules. As can be appreciated by one of ordinary skill in the art, each of the modules can comprise various sub-routines, procedures, definitional statements, and/or macros. Moreover, individual modules can be compiled and linked into an executable program, installed in a dynamic link library, or may be written in an interpretive language. It will be appreciated that software modules can be callable from other modules or from themselves, and/or may be invoked in response to detected events or interrupts.

In certain embodiments, the messaging auditing component 114 is further configured to generate one or more event logs 116 that include information captured, detected or otherwise generated in real time by the messaging auditing component 114. For instance, the event log(s) 116 can include information on user activity, non-owner access and/or configuration changes in the messaging service 112. Although the event log(s) 116 are shown as being stored on the messaging system 110, it will also be understood that the event log(s) can be stored with the messaging auditing component 114 or remote to the messaging system 110. In certain embodiments, the event log(s) are encrypted, write-protected or otherwise maintained to prevent modification of information therein by users, administrators or other personnel with privileged or super access rights.

The messaging auditing component 114, in certain implementations, outputs data obtained from or concerning the messaging service 112 to the management server 120 for storage and/or analysis. For instance, data from the event log(s) 116 may be evaluated and/or sent to the management server 120. In certain embodiments, the messaging auditing component 114 encrypts this data prior to transmission to the management server 120. The data can be stored, for instance, in an audit database 136, such as a SQL server.

The management server 120 further comprises a rules engine 122. In certain embodiments, the rules engine 122 is configured to analyze the data either as it is received (e.g., streamed) directly from the messaging auditing component 114 or after retrieving the data from the audit database 136. In certain embodiments, the rules engine 122 includes user-defined business rules, policies, metrics, sites, data sources, configuration objects, real-time monitoring rules, combinations of the same or the like. For instance, the rules engine 122 can be used to determine when a report and/or alert needs to be sent to the monitoring console 130 based on information gathered by the messaging auditing component 114. Moreover, in certain embodiments, the rules can be configured to establish what types of data, mailboxes, and the like the messaging auditing component 114 is to monitor.

For example, rules can be based on one or more of the following: non-owner mailbox access, changes in mailbox permissions, creation of a scheduled task with a system context, modification of folder permissions in another user's mailbox, and/or modification of a delegate in another user's mailbox.

The illustrated management server 120 further comprises a configuration module 124. In certain embodiments, the configuration module 124 receives user input regarding settings for the monitoring and/or auditing of the messaging service 112. In certain embodiments, the configuration module 124 communicates with a computer operated by information technology (IT) personnel, an administrator, a security officer, a compliance officer or auditor, or the like.

For instance, the configuration module 124 can be adapted to interact with a user interface to manage reporting tasks and/or real-time alerting by the management server 120. In certain embodiments, reporting tasks can include storing audit data in repositories, importing necessary data to audit databases and/or building reports based on the data. Real-time alerting can include, for instance, creating alerts when particular events are detected, storing the alerts in a database, and/or immediately issuing notifications. In certain embodiments, the configuration module 124 can be further adapted for obtaining and/or analyzing data stored in the audit database 136, modifying rules in the rules engine 122, combinations of the same or the like.

In certain embodiments, the configuration module 124 can be configured to communicate with the monitoring console 130 to obtain user input regarding the auditing of messaging service data. In other embodiments, at least a portion of the configuration module 124 comprises a snap-in tool for executing within a Microsoft® Management Console (MMC).

The monitoring console 130 advantageously provides an interface for communicating to a user one or more results of the monitoring process. In certain embodiments, the monitoring console 130 comprises a web-based application for working with real-time monitoring alerts. For instance, the application may track the progress of alert resolution and/or include tools for customizing the user interface display. In certain embodiments, at least a portion of the monitoring console 130 is configured to integrate with Microsoft® Operations Manager (MOM) or System Center Operation Manager.

As illustrated in FIG. 1, the monitoring console 130 further comprises reports 132 and alerts 134. In certain embodiments, the alerts 134 comprise real-time notification of events of interest, such as for example, via email, a text message, a pop-up window, a pager notification, combinations of the same or the like. The reports 132, in certain embodiments, comprise an analysis tool, such as a log or list of the events of interest, that may be later accessed and evaluated. Moreover, in certain embodiments, the monitoring console 130 can be configured to maintain user profiles such that users can view only the alerts and/or reports they need and/or have permission to access. For example, the monitoring console may have one profile for users viewing alerts on Exchange Server configuration changes and a different profile for those interested in viewing occurrences of non-owner mailbox access.

FIG. 1 further depicts a domain controller 140 in communication with the management server 120. In certain embodiments, the domain controller 140 comprises one or more server computers responsible for security authentication requests and/or directory services within a particular Microsoft Windows® Server domain. As shown, the domain controller 140 comprises a directory service 142, which is used to unify and/or centralize the management of an organization's user departments and/or IT resources. In certain preferred embodiments, the directory service 142 comprises Microsoft Active Directory®.

A directory auditing component or module 144 also resides on the domain controller 140. In certain embodiments, the directory auditing component 144 can include software modules or subcomponents for monitoring or auditing the directory service 142. For example, the directory auditing component 144 can be a plug-in adapted to monitor changes to mailbox permissions, changes to attributes of Exchange-related Active Directory® objects (e.g., changes to configuration of the Exchange organization), changes to email parameters of users, groups and contacts in the directory, combinations of the same and the like. It will be appreciated that in other embodiments, the directory auditing component 144 can at least partially reside on a remote system such as the management server 120.

In certain embodiments, the directory auditing component 144 is further configured to generate one or more event logs 146 that include information captured, detected or otherwise generated by the directory auditing component 144. For instance, the event log(s) 146 can include information on where a change was performed, what attribute was changed, a new attribute value, an old attribute value, combinations of the same and the like. In certain embodiments, the event log(s) 146 are stored remotely with respect to the domain controller 140 or can be maintained by the directory auditing component 144.

Although the monitoring system 100 has been described above with respect to particular arrangements, other embodiments of the invention may include more or fewer components or modules than those depicted in FIG. 1. For instance, in certain embodiments, the monitoring system 100 may function without the domain controller 140 or the directory auditing component 144. In yet other embodiments, the rules engine 122 can be distributed among one or more of the monitoring components on the monitored system(s).

Figure 2:
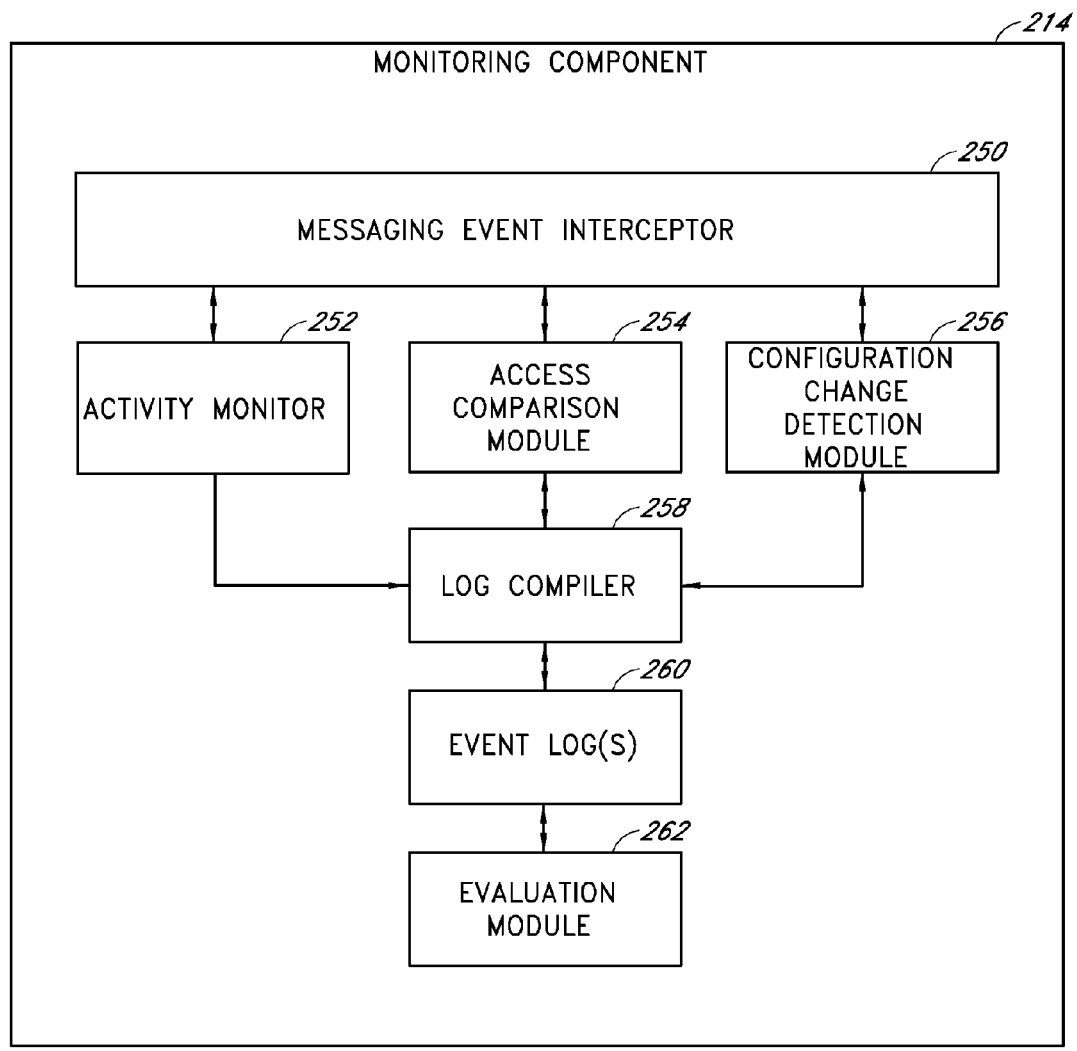
FIG. 2 illustrates a block diagram of an exemplary embodiment of a messaging auditing component usable by the monitoring system of FIG. 1.

FIG. 2 illustrates a block diagram of an embodiment of a monitoring component 214 usable, for example, by the monitoring system 100 of FIG. 1. For instance, in certain embodiments, the monitoring component 214 can be installed on the messaging system 110 to audit and/or track data of the messaging service 112. In such embodiments, the monitoring component 214 may be the same as or similar to the messaging auditing component 114 and the event log(s) 116.

For exemplary purposes, the monitoring component 214 will be described with reference to monitoring a Microsoft® Exchange environment. For instance, the monitoring component 214 can comprise a plug-in that executes under the SYSTEM account and that interacts with the Exchange store service to monitor and/or track Exchange-related events. However, it will be understood from the disclosure herein that embodiments of the monitoring component 214 may be similarly used with other types of messaging systems, examples of which are provided above.

As shown in FIG. 2, the monitoring component 214 comprises a messaging event interceptor 250 that interacts with data from the messaging service. In certain embodiments, the interceptor 250 can comprise multiple modules that interact with different portions of the messaging service. For instance, in certain embodiments, the interceptor 250 tracks or "listens" to user activity in the Exchange store and/or changes to Exchange server protocol configurations. In certain embodiments, the interceptor 250 is configured to track activity by general users, users with special privileges (e.g., send-as privileges), administrators, super users and/or other personnel with special access rights (such as privileges granted by a mailbox owner).

In certain embodiments, the interceptor 250 comprises a special purpose dynamic link library (dll) file that monitors and interacts with the store.exe process of Microsoft® Exchange. For instance, as discussed in more detail below, the dll file can be configured to intercept original Microsoft® Exchange functions and further process information that comes from the Exchange server. In certain embodiments, the interceptor 250 can comprise a hook, one or more injected functions or jump instructions, a jump table, a program, a script, combinations of the same or the like.

The illustrated interceptor 250 advantageously communicates data obtained from and/or about the monitored messaging service to an activity monitor 252, an access comparison module 254 and a configuration change module 256. In certain embodiments, the activity monitor 252 comprises an agent module that tracks what type of access was performed with respect to the messaging system data. For instance, the activity monitor 252 can determine if an item (e.g., email message, appointment, task list) was read, copied, created, modified, moved, and/or forwarded by a user.

In certain embodiments, the activity monitor 252 comprises an injection module that is configured to identify read access with respect to messaging system data. Moreover, in certain embodiments, information regarding other types of access (e.g., such as when Exchange store items are saved, deleted, moved, copied or modified) is obtained through an application program interface (API). For instance, data regarding particular events or callback functions in Microsoft® Exchange can be obtained through the Exchange OLE DB (ExOLEDB) providers and Microsoft® ActiveX® data objects (ADO).

In certain embodiments, the access comparison module 254 is used to determine when a user accesses a mailbox other than his or her own. For instance, the comparison module 254 can compare a user identifier of the owner of an accessed mailbox with the user identifier of the user that actually accessed the mailbox. In certain embodiments, the comparison module 254 is configured to examine certain calls or requests that relate to the particular mailbox access to determine the identity of the user who issued the specific call or request. Moreover, in certain arrangements, the comparison module 254 can be further configured to determine the location of the accessing user, such as by obtaining a host IP address of the user.

In other embodiments, the access comparison module 254 can be configured to compare other types of data and/or can be configured to track access to data structures other than email mailboxes (e.g., folders, calendars, or the like). Moreover, the access comparison module 254 may be further configured to filter out certain types of non-owner mailbox access, such as may occur when an owner utilizes a Blackberry® device to obtain email from the owner's mailbox on an Exchange server.

The configuration change detection module 256 also communicates with the interceptor 250. In certain embodiments, the configuration change detection module 256 is configured to track changes to configuration settings of Microsoft Exchange Server®. For example, the configuration change detection module 256 may track changes to Exchange server protocol, mailbox permissions, logging settings, combinations of the same or the like.

In certain embodiments, the configuration change detection module 256 interacts with a Windows® Management Instrumentation (WMI) provider. For instance, the configuration change detection module 256 can be configured to analyze one or more WMI callbacks.

Each of the activity monitor 252, the access comparison module 254, and the configuration change module 256 communicates with a log compiler 258. The log compiler 258 transfers data received from at least one of these three components to one or more event logs 260. In certain embodiments, the log compiler 258 writes events of different types to the same log. In yet other embodiments, different categories of events can be recorded on different logs. For instance, a non-owner mailbox access event may be written in a first event log, while a mailbox configuration change event may be written to a second event log.

The monitoring component 214 further comprises an evaluation module 262 that reads the event log(s) 260 and transmits relevant event data to be further analyzed and/or stored, such as to the management server 120 and/or the audit database 136. In certain embodiments, multiple evaluation modules 262 throughout a network are used to transmit the relevant event data from multiple messaging system servers to a common location.

In certain embodiments, the evaluation module 262 selectively transmits information on messaging events that have been identified as events of interest. In such embodiments, the evaluation module 262 serves as a filter for events captured in the event log(s) 260. In other embodiments, the evaluation module 262 collects information on all the events listed in the event log(s) 260 and transmits the data to a desired location. For example, the management server 120 may configure the evaluation module 262 based on rules from the rules engine 122 and/or settings from the configuration module 124.

Moreover, the evaluation module 262 can be configured to continuously or periodically transmit a list of events to the management server 120. In yet other embodiments, the evaluation module 262 can be configured to transmit information upon demand by the management server 120 or user.

Although the monitoring component 214 has been described with reference to particular arrangements, it will be understood from the disclosure herein that other embodiments are feasible. For instance, the monitoring component 214 may function with more or fewer components than shown in FIG. 2.

Moreover, the monitoring component 214 may be divided into multiple subcomponents or modules depending on the type of data being monitored. Such subcomponents may be located remote to each other and communicatively coupled through a network. In other embodiments, one or more of the evaluation module 262 and the event log(s) 260 may be separate from the monitoring component 214. For example, in other embodiments, the management server 120 may comprise the evaluation module 262.

Figure 3:
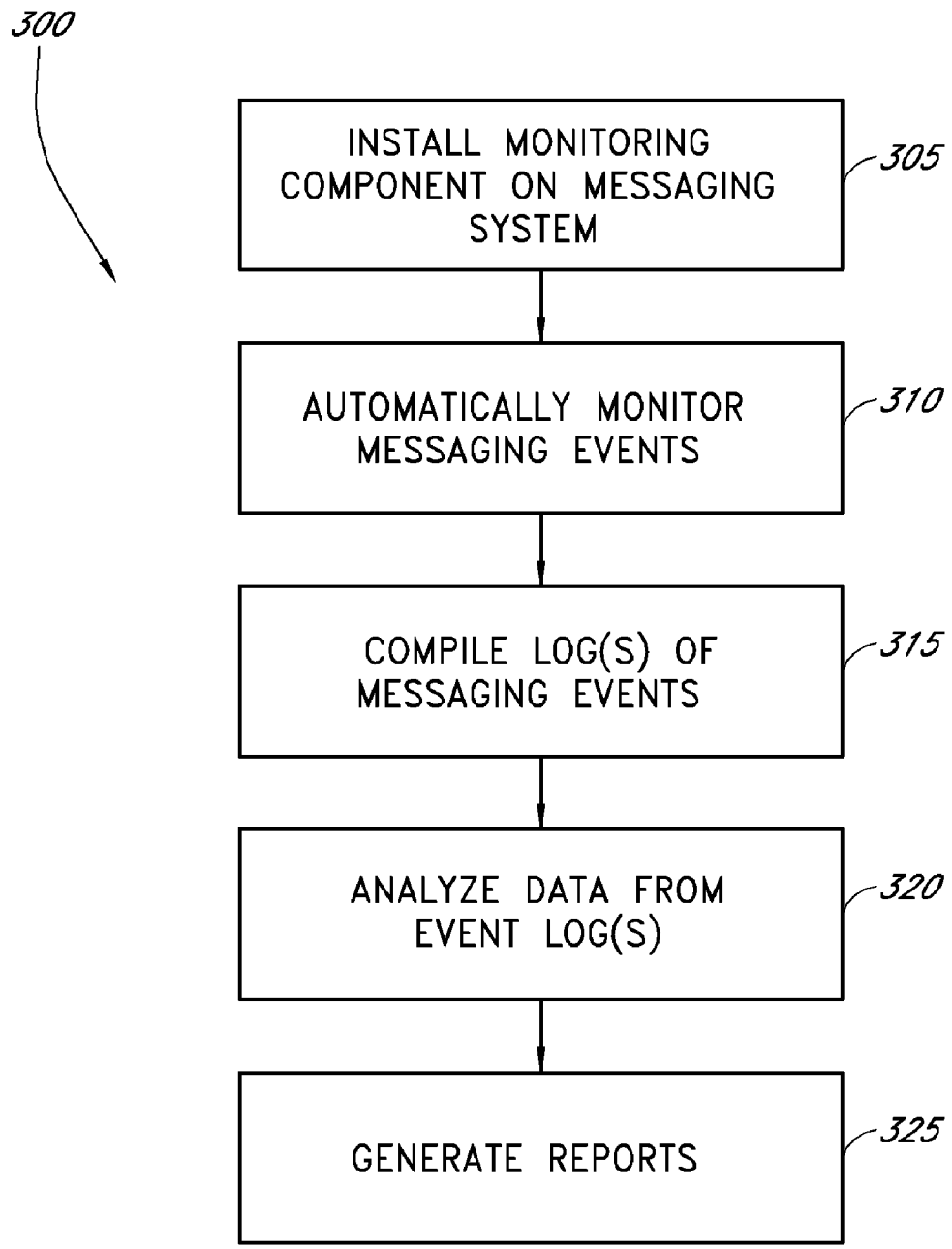
FIG. 3 illustrates a flowchart of an exemplary embodiment of a monitoring process performable by the monitoring system of FIG. 1.

FIG. 3 illustrates a flowchart of an embodiment of a monitoring process 300 performable, for example, by the monitoring system 100 of FIG. 1. In general, the monitoring process 300 comprises a process for generating real-time alerts and/or audit data based on messaging system events. For exemplary purposes, the monitoring process 300 will be described herein with reference to the monitoring component 214 of FIG. 2 and the Microsoft® Exchange messaging service.

The monitoring process 300 begins at Block 305 wherein the monitoring component 214 is installed on the messaging system. For instance, in certain embodiments, Block 305 may comprise installing a plug-in on each Exchange Server in the messaging system. More particularly, installing the plug-in can comprise installing a special-purpose dynamic link library (dll) file that monitors and interacts with the Exchange store.exe process. In certain embodiments, the dll file is configured to intercept original Microsoft® Exchange functions and perform additional processing of information coming from the Microsoft Exchange Server®.

At Block 310, the monitoring component 214 monitors messaging events occurring during the operation of the messaging service. Such operation can include sending and receiving email, allowing access to mailboxes by owners and delegates, storing appointments and contacts, combinations of the same and the like. For instance, during operation of the messaging service, Exchange data can be written to and read from the Exchange store. In certain preferred embodiments, monitoring of the messaging events is performed automatically in real-time concurrently with the operation of the messaging service. As the monitoring component 214 detects particular messaging events, the monitoring component 214 compiles one or more logs 260 of messaging events (Block 315).

At Block 320, the messaging event data in the event logs 260 is analyzed, such as by the evaluation module 262. For instance, such analysis can include processing the event data, filtering the event data, combining event data, combinations of the same or the like. In certain embodiments, such analysis further includes utilizing a rules or processing engine to determine which events have been designated as events of interest and/or to access stored rules or policies for managing the event log data. For example, in certain embodiments, the monitoring component 214 can communicate with a management server to receive instructions regarding which type of Exchange events to monitor or audit.

Based on the analysis during Block 320, the monitoring process 300 generates one or more reports and/or alerts to notify users of the occurrence of the event(s) of interest (Block 325).

In other embodiments, the monitoring process 300 can include more or fewer blocks than those depicted in FIG. 3. For instance, the monitoring process 300 can further include installing one or more plug-ins on domain controllers to capture and/or audit changes made to an Exchange organization and/or to Exchange-related parameters for objects stored in Active Directory®.

Figure 4:
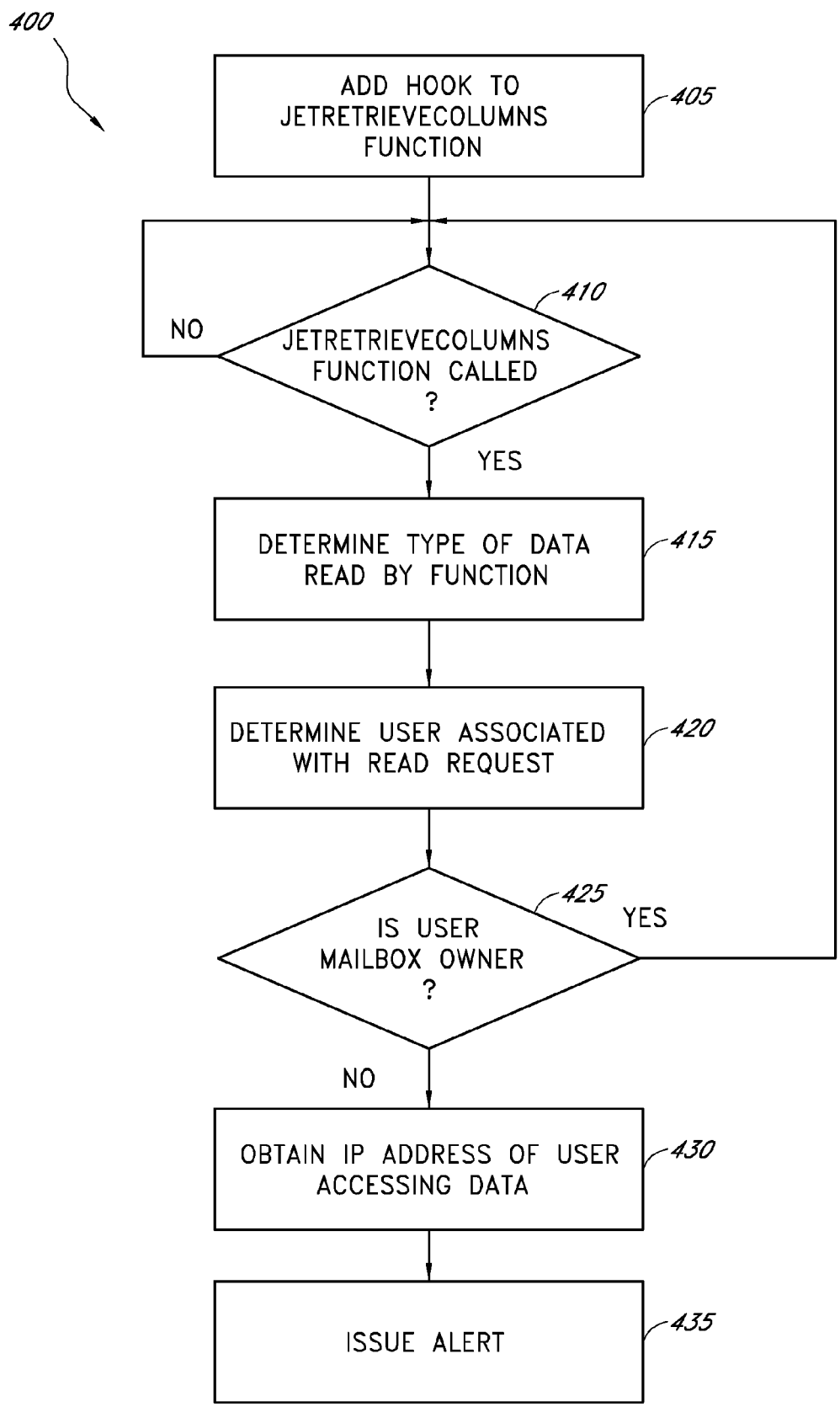
FIG. 4 illustrates a flowchart of an exemplary non-owner mailbox access detection process performable by the monitoring system of FIG. 1.

As discussed above, the monitoring systems disclosed herein are configured to audit, in real time, messaging activity and identity messaging events that have been designated as of interest. FIG. 4 illustrates further details of one example of a non-owner mailbox access detection process 400 performable, for instance, by the monitoring system 100 of FIG. 1. For exemplary purposes, the detection process 400 will be described herein with specific reference to message and folder read events in a Microsoft® Exchange environment. It will be understood, however, that similar detection processes can be used in other messaging systems to identify non-owner mailbox access events.

The non-owner mailbox access detection process 400 begins at Block 405 wherein a hook is added to a function of the Exchange service. For example, a hook can be added to the JetRetrieveColumns function, which is configured to read a specified number of columns from a current extensible storage engine (ESE) table and retrieve multiple column values from the table. At Block 410, the detection process 400 determines if the JetRetrieveColumns function is called based on information passed from the hook.

When the JetRetrieveColumns function is called, the detection process 400 determines what type of data was read (Block 415). For example, the detection process 400 can determine if a folder or a message was read based on which columns were identified by the JetRetrieveColumns function. In certain embodiments, the detection process 400 is configured to monitor all mailboxes within the mailbox stores on an Exchange server except for system mailboxes, such as "SMTP," "System attendant" and "System mailbox."

At Block 420, the detection process 400 determines the identity of the user associated with the mailbox read request. Although Block 420 is illustrated as following the determination of what type of data was accessed (Block 415), it will be understood that that Block 420 could be performed at least partially simultaneously with and/or prior to Block 415.

At Block 425, the detection process 400 compares the user who called the JetRetrieveColumns function with the owner of the mailbox. In certain embodiments, this comparison is performed by the access comparison module 254 of FIG. 2. If the user who accessed the mailbox is the mailbox owner, the detection process returns to Block 410. On the other hand, if there was a non-owner mailbox access, the detection process 400 continues with Block 430 to obtain the IP address of the user.

In certain embodiments, Block 430 comprises obtaining an IP address and/or user ID using store.exe. For instance, to obtain an IP address, a hook can be added to the NdrServerCall2 remote procedure call (RPC) function, which is called whenever an RPC method is invoked. Next, a pointer to the RPC_Message structure is passed into the NdrServerCall2 RPC function. Finally, the IP address of the user accessing the mailbox data is retrieved from the RPC_Binding_Handle function of the RPC_Message structure by sequentially calling the following functions: RpcBindingServerFromClient, RpcBindingToStringBinding and RpcStringBindingParse. In most cases, such a routine allows the detection process 400 to determine the IP address and/or user ID for the user that accessed the mailbox data.

In situations wherein the user is accessing the mailbox data through a web browser from a remote location (e.g., using Outlook® Web Access), obtaining the IP address of the user can be performed in a different manner. In such embodiments, Block 430 can include using an internet information services (IIS) extension to intercept IIS requests. In certain embodiments, requests unrelated to Microsoft® Exchange are passed on and ignored. For Exchange-related requests, the user and IP address information is retrieved using the GetServerVariable function.

Once it has the data from the request, the IIS extension writes the data within the monitoring component. As the normal processing of the particular request completes, the IIS extension transmits the following information: "User A at IP address X has completed request processing." If an event is detected from store.exe, the event can be used to match the user information from the store event and information from the IIS extension to obtain the IP address.

In situations where several requests from the same user come at once from different IP addresses, alternative methods for matching the user with the IP address can be used. For instance, in such situations, if a new request was sent by a user who has already made other requests, the new request is queued. This provides that, at any time, for any user, only one request is being processed by the monitoring system. Thus, events can be matched by user information, and IP addresses can be retrieved.

It will also be apparent from the disclosure herein that Block 430 can be performed at different times in the detection process 400. For instance, in other embodiments, the detection process 400 may obtain the IP address prior or at least partially concurrently with Blocks 415, 420 and/or 425.

After obtaining the IP address of the user, the detection process 400 terminates by issuing an alert and/or report notifying of the non-owner mailbox access (Block 435). In certain embodiments, the alert can comprise one or more of the following pieces of information: what type of access occurred to which mailbox, from where the access request originated (e.g., the IP address of the user), when the access occurred, who accessed the mailbox, the owner of the mailbox, combinations of the same or the like. In certain embodiments, the alert can be in the form of an automatically generated email sent to an administrator or other IT personnel. In yet other embodiments, the alert can be transmitted through an interface of a monitoring console, such as the monitoring console 130 of FIG. 1.

Although the non-owner mailbox access detection process 400 has been described above with respect to particular embodiments, the detection process 400 can also utilize different methods to achieve similar results. For instance, in other embodiments, the detection process 400 can utilize other functions in place of or in addition to the JetRetrieveColumns function, such as for example, the dlls function, when monitoring a messaging system. Moreover, as discussed above, the detection process 400 can further utilize particular APIs associated with the messaging system, such as for example the Store Events API in Microsoft® Exchange, in order to obtain information relevant to particular access events.

Furthermore, in other embodiments, other types of actions may be monitored by the monitoring system. For example, the monitoring system can be configured to track changes to client permissions in mailboxes on an Exchange server. In such embodiments, data that can be tracked when folder permissions are changed includes: where the change was performed (e.g., IP address, name of the mailbox owner, path to the folder in the mailbox), the folder name, who changed the folder permissions, the new folder permissions value, the old folder permissions value, combinations of the same and the like. Moreover, data that can be tracked if a delegate is created or removed or if permissions granted to delegates are changed includes: where the delegate permissions change or delegate assignment was performed, who made the change or assignment, which items were changed or assigned, the old permissions for delegated items, the new permissions for delegated items, combinations of the same or the like.

Moreover, embodiments of the invention can be configured to track changes to configuration of Exchange server protocols, which includes, but is not limited to: hypertext transfer protocol (HTTP) authentication, connections, and access control; internet message access protocol (IMAP) authentication, connections, and access control; POP3 authentication, connections, and access control; and network news transfer protocol (NNTP) authentication, connections, and access control. Associated data that can be tracked includes: where the change was performed (e.g., IP address), the name of the changed parameter, the old value of the changed parameter, the new value of the changed parameter when the action was performed, combinations of the same or the like.

Figure 5:
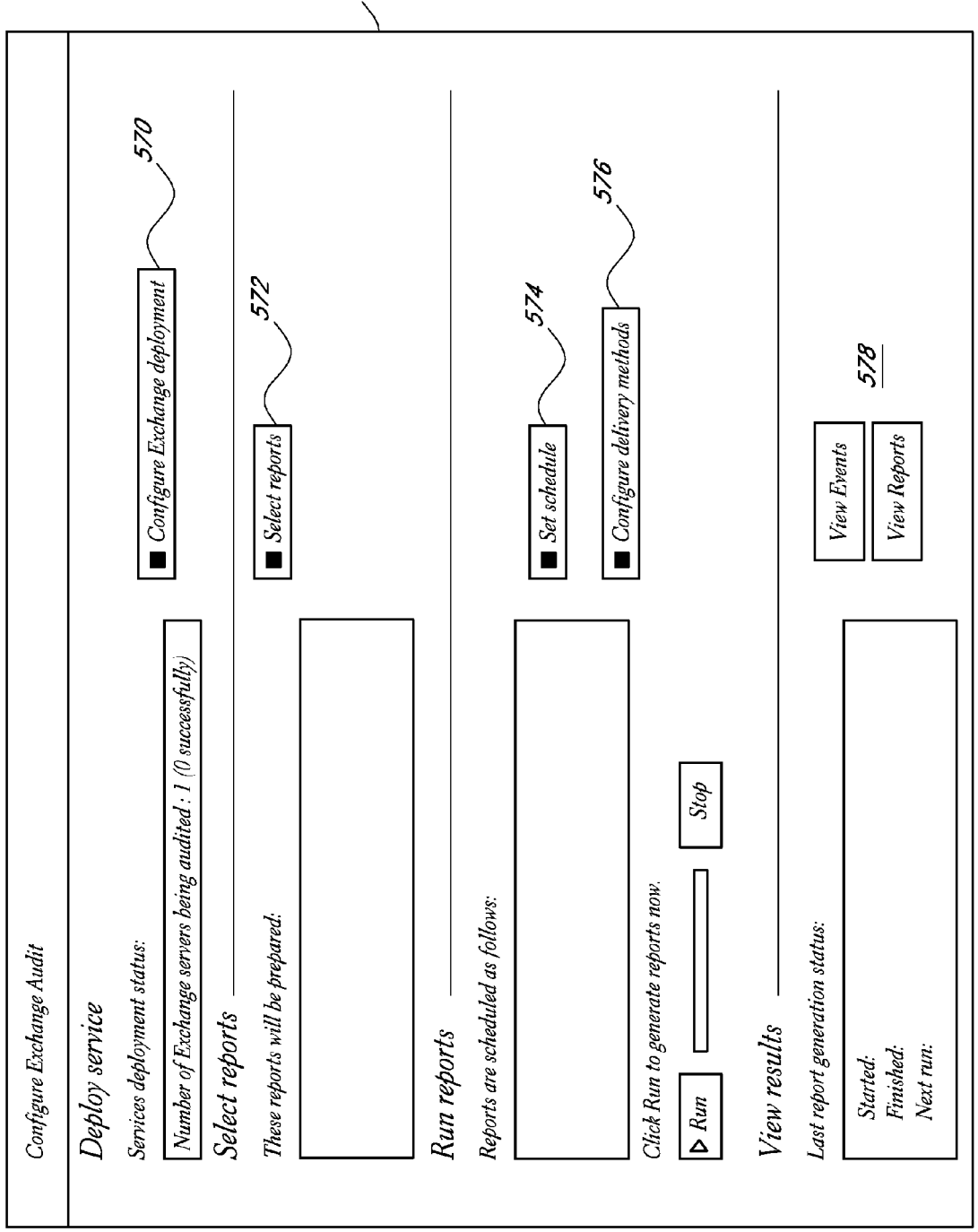
FIG. 5 illustrates an exemplary embodiment of a user interface of a configuration tool usable with the monitoring system of FIG. 1.

FIG. 5 illustrates a user interface 500 of a configuration tool usable with, for example, the monitoring system 100 of FIG. 1, according to certain embodiments of the invention. In certain embodiments, the configuration tool allows a user to manage different aspects of real-time data auditing including, but not limited to: where monitoring components are installed, what type of information is audited or reported, when and/or how the reports are generated, combinations of the same or the like. In certain embodiments, the configuration tool communicates with or is part of the configuration module 124 of the management server 120.

As shown, the user interface 500 provides a user with several options for configuring Microsoft® Exchange auditing. For instance, the interface 500 includes a "Configure Exchange deployment" option 570 that allows a user to specify on which Microsoft Exchange Servers® a monitoring component should be deployed. The interface 500 also displays the current number of servers being audited.

A "Select reports" option 572 allows a user to identify which types of events he or she is interested in viewing. The "Set schedule" option 574 allows a user to define when a report is to be gathered, and the "configure delivery methods" option 576 enables a user to select how the report(s) will be delivered (e.g., via email, saved on a network, or the like). The view results section 578 further allows a user to specify which report(s) and/or alert(s) are to be viewed.

In other embodiments of the invention, the user interface 500 can include different arrangements. For instance, the user interface 500 can be divided among several different windows. In yet other embodiments, the user interface 500 can allow a user to define which events are to be included in a specific report or alert.

FIG. 6 illustrates a screen display 600 of a non-owner mailbox access report usable, for example, by the monitoring system 100 of FIG. 1, according to certain embodiments of the invention. For instance, in certain embodiments, the screen display 600 can be generated and/or maintained by the monitoring console 130 of FIG. 1.

As shown, the screen display 600 identifies user activity in non-own mailboxes. For instance, section 680 identifies activity by the user ABC in other users' mailboxes, while section 682 depicts activity by user EFG. In particular, the screen display 600 identifies: the time of the non-owner access, which server and non-owner mailbox were accessed, what type of action occurred, the type of object that was accessed, and the subject or name of the accessed object.

As can be seen, the screen display 600 provides an administrator with a straightforward interface for monitoring non-owner access of mailboxes. Such a centralized and comprehensive view allows an administrator to take prompt corrective action or to alert appropriate personnel if needed.

Certain embodiments of the invention also support cluster and non-cluster configuration for Microsoft Exchange 2000® and active/passive Exchange 2000 and 2003 clusters that run Microsoft® Cluster Server.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

While certain embodiments of the inventions have been described, these embodiments have been presented by way of example only, and are not intended to limit the scope of the disclosure. For example, the description of the Microsoft® Exchange system relates only to a description of some embodiments of the invention. Other embodiments of the system may be directed to non-Microsoft® messaging systems. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for auditing messaging activity in an exchange server electronic messaging system, the method comprising:
   automatically examining, in real-time, a plurality of messaging events generated during operation of an exchange server electronic messaging service, wherein the automatically examining is performed by adding a hook to the exchange server electronic messaging service, the hook executing in one or more computer processors, wherein the hook is configured to detect a request by a user to access a mailbox and to obtain data associated with the request;
   detecting from the plurality of messaging events a request by a user to access a mailbox associated with the exchange server electronic messaging service;
   obtaining data associated with the request wherein the data comprises a type of access performed by the user and an identify of the user;
   comparing the identity of the user with an identity of the mailbox owner;
   automatically determining whether the type of access performed by the user with respect to the mailbox is changing at least one permission of a folder associated with the mailbox; and
   when the type of access is changing at least one folder permission, issuing an alert when the identity of the user is not the same as the identity of the mailbox owner, the alert reporting information on the particular mailbox accessed, the identity of the user, a path to the folder in the mailbox, a folder name, one or more new folder permission values, and one or more old folder permission values with respect to the mailbox.

2. The method of claim 1, additionally comprising determining an internet protocol (IP) address of the user.

3. The method of claim 1, wherein the adding the hook further comprises installing an interceptor module on at least one server executing the exchange server electronic messaging service.

4. The method of claim 1, wherein said automatically examining comprises intercepting, with the interceptor module, data being transmitted to an exchange server electronic messaging store.

5. The method of claim 3, additionally comprising accessing a rules engine on a management server remote to the at least one exchange server to determine which of the plurality of messaging events to intercept with the interceptor module.

6. The method of claim 1, wherein said type of access comprises read access.

7. The method of claim 1, wherein the user has administrator privileges with respect to the exchange server electronic messaging service.

8. The method of claim 1, additionally comprising detecting configuration changes to the exchange server electronic messaging service.

9. The method of claim 8, wherein said detecting configuration changes comprises monitoring a directory service installed on a domain controller.

10. A system for auditing user activity in an exchange server electronic messaging environment, the system comprising:
- a monitoring component configured to execute on a server running an exchange server electronic messaging service, the monitoring component comprising:
  - an interceptor module configured to detect, in real-time, a call generated by a user to access a mailbox of the exchange server electronic messaging service, wherein the interceptor module comprises a hook added to the exchange server electronic messaging service, the hook executing in one or more computer processors, wherein the hook is configured to detect a request by a user to access a mailbox and to obtain data associated with the request, the data comprising at least a type of access performed by the user and an identity of the user,
  - a comparison module in communication with the interceptor module, the comparison module being configured to transmit a non-owner access event when the user is not the owner of the mailbox being accessed, and
  - an activity monitor configured to automatically determine whether the type of access associated with the call to access the mailbox is changing at least one permission of a folder associated with the mailbox; and
- when the type of access is changing at least one folder permission, a user interface component in network communication with the monitoring component, the user interface component being configured to automatically generate an alert in response to the comparison module transmitting the non-owner access event, the alert comprising information indentifying the accessed mailbox, an identity of the user, a path to the folder in the mailbox, a folder name, one or more new folder permission values, and one or more old folder permission values with respect to the mailbox.

11. The system of claim 10, wherein the hook is added to a native function of the exchange server electronic messaging service.

12. The system of claim 11, wherein the native function comprises a JetRetrieveColumns function.

13. The system of claim 10, further comprising a management component coupling the user interface component to the monitoring component, the management component being configured to instruct the monitoring component to compile one or more logs identifying messaging activity of interest.

14. The system of claim 13, wherein the monitoring component, the user interface component and the management component are each installed on different server computers that are remotely coupled through a network.

15. The system of claim 13, further comprising a second monitoring component in communication with the management component and configured to detect changes to permissions to at least one mailbox of the exchange server electronic messaging service.

16. The system of claim 15, wherein the second monitoring component is installed on a domain controller and is configured to monitor a directory service on the domain controller.

17. The system of claim 10, wherein the monitoring component comprises a plug-in module.

18. The system of claim 10, wherein the alert comprises an email message.

19. A system for auditing activity in an exchange server electronic messaging service, the system comprising:
- means for automatically examining, in real-time, messaging events generated during operation of an exchange server electronic messaging service, wherein the means for automatically examining comprises a hook added to the exchange server electronic messaging service, the hook executing in one or more computer processors, wherein the hook is configured to detect a request by a user to access a mailbox and to obtain data associated with the request;
- means for detecting from the messaging events a request by a user to access a mailbox associated with the exchange server electronic messaging service;
- means for obtaining data associated with the request wherein the data comprises a type of access performed by the user and an identify of the user;
- means for comparing the identity of the user with an identity of the mailbox owner;
- means for automatically determining whether the type of access performed by the user with respect to the mailbox is changing at least one permission of a folder associated with the mailbox; and
- when the type of access is changing at least one folder permission, means for issuing an alert when the identity of the user is not the same as the identity of the mailbox owner, the alert reporting information on the mailbox accessed, the identity of the user, a path to the folder in the mailbox, a folder name, one or more new folder permission values, and one or more old folder permission values with respect to the mailbox.

\* \* \* \* \*

UNITED STATES PATENT AND TRADEMARK OFFICE
CERTIFICATE OF CORRECTION

PATENT NO.      : 7,979,494 B1  
APPLICATION NO. : 11/934610  
DATED           : July 12, 2011  
INVENTOR(S)     : Roman Alexandrovich Golovin et al.

Page 1 of 1

It is certified that error appears in the above-identified patent and that said Letters Patent is hereby corrected as shown below:

At Column 14, line 47, in Claim 1, please change "identify" to --identity--.

At Column 16, line 43, in Claim 19, please change "identify" to --identity--.

Signed and Sealed this  
Seventh Day of February, 2012

David J. Kappos  
*Director of the United States Patent and Trademark Office*